United States Patent [19]

Vartiak

[11] 3,918,904
[45] Nov. 11, 1975

[54] CONTROLLING EVAPORATION OF WATER

[75] Inventor: Joseph F. Vartiak, Naperville, Ill.

[73] Assignee: Nalco Chemical Company, Chicago, Ill.

[22] Filed: Mar. 28, 1974

[21] Appl. No.: 455,855

[52] U.S. Cl............ 21/60.5 A; 21/60.5 R; 252/384
[51] Int. Cl.² ........................................... B01J 1/18
[58] Field of Search....... 21/60.5 A, 60.5 R; 210/54, 210/10; 260/29.6 XA, 29.6 H, 29.6 PM, 29.6 B; 252/384

[56] References Cited
UNITED STATES PATENTS

| | | | |
|---|---|---|---|
| 2,797,139 | 6/1957 | Veatch | 21/60.5 R |
| 3,418,237 | 12/1968 | Booth et al. | 210/54 |
| 3,431,062 | 3/1969 | Fox | 21/60.5 R |
| 3,624,019 | 11/1971 | Anderson et al. | 260/29.6 H |
| 3,734,873 | 5/1973 | Anderson et al. | 260/29.6 B |

Primary Examiner—Barry S. Richman
Assistant Examiner—Dale Lovercheck
Attorney, Agent, or Firm—Kinzer, Plyer, Dorn & McEachron

[57] ABSTRACT

Retarding the rate of water evaporation by adding to the body of water a water-soluble vinyl addition polymer in the form of acrylamide sodium acrylate copolymer.

2 Claims, No Drawings

CONTROLLING EVAPORATION OF WATER

This invention relates to a method of retarding the evaporation of water, specifically by incorporating a water-soluble vinyl addition polymer in a body of water.

There are of course numerous instances where it is desirable that evaporation of water be retarded: quiescent irrigation ponds and stock watering ponds supplied by a pump; the quiescent surface water presented by freshly laid cement or concrete in some instances; outdoor swimming pools; vegetation transplants accomplished by a nursery service or within a greenhouse and so on. These useful results and others as well may be realized, under the present invention, by incorporating in a body of water a water-soluble vinyl addition polymer calculated as sufficient to retard evaporation to a predetermined rate and so to do is the primary object of the present invention. The preferred polymer under the present invention is polyacrylamide-acrylic acid salt (sodium), but this is only representative in accordance with the example set forth below inasmuch as numerous equivalents may doubtless be found among the polymers identified in U.S. Pat. Nos. 3,734,873; 3,624,019; 3,418,237; 3,259,570 and 3,171,805, concerned with the preparation of water soluble vinyl addition polymers, including polyacrylamide, sodium polyacrylate and copolymers thereof suitable to practice the present invention.

Water soluble vinyl addition polymers are well known. Perhaps the best known form is represented by polyacrylamide and copolymers thereof such as polyacrylamide-acrylic acid or acid salt containing from 95–5 percent by weight acrylamide which is the presently preferred polymer. The polymer dissolved in water may be derived by inverting a water-in-oil emulsion containing the vinyl addition polymer. See U.S. Pat. Nos. 3,624,019 and 3,734,873. There are literally hundreds of preparations when one considers the wide variety of homopolymers and copolymers, the oil used for the emulsion and the surfactants (nonionic, cationic, anionic) which may be used to effect inversion. The preference under the present invention is to employ the polymer in a water dissolved state, since in that form it is easily dispersed throughout the water system. The molecular weight of the polymer may be as low as $10^3$ and up to $40 \times 10^6$.

EXAMPLE

A water-in-oil emulsion of 30 percent by weight of acrylamide sodium acrylate copolymer (64:36) was prepared and inverted by using an appropriate surfactant, resulting in a water solution of the vinyl addition copolymer. The oil was Isopar M in the proportion of approximately 26 parts by weight to 36 parts of water following the procedures of U.S. Pat. No. 3,734,873. The copolymer had an average molecular weight of $12 \times 10^6$.

The inverted product thus prepared was added to tap water in the proportion of 8 ounces (approximately 67.2 grams copolymer solids) per 100 gallons of water (approximately 378,500 grams) so that the effective amount of the copolymer was 177 ppm or approximately 0.02 percent by weight. A volume of the tap water sample treated with the polymer in the effective amount was compared for evaporation rates to an equal volume of untreated tap water under identical conditions, including the surface area exposed to the atmosphere for evaporation which was 63.62 mm$^2$. The untreated sample evaporated at the expected rate of 2.75 mg per minute (0.0432 mg/mm$^2$/min.) whereas the treated sample evaporated at the slower rate of 2.37 mg per minute (0.0372 mg/mm$^2$/min.) nearly a 14 percent retardation rate.

The invention may be practiced simply by determining the rate to which evaporation should be retarded as a matter of economics or convenience and then adding the amount of polymer which will produce that rate.

It is not new to add a water soluble vinyl addition polymer to a liquid medium for that much has been done in connection with water clarification, sewage treatment and in order to avoid misting when spraying herbicides. However, I know of no prior instance where the addition polymer has been incorporated in a supply of tap water or natural water per se to retard evaporation to a predetermined rate when or as the water is used.

I claim:

1. A method of retarding evaporation of a body of water to a predetermined rate by adding to the body of water a water soluble vinyl addition polymer in the form of acrylamide sodium acrylate copolymer in an amount sufficient to retard evaporation to said rate.

2. A method according to claim 1 where the polymer is itself dissolved in water prior to being added to the body of water.

* * * * *